US011131392B2

(12) United States Patent
Inoue

(10) Patent No.: US 11,131,392 B2
(45) Date of Patent: Sep. 28, 2021

(54) SUCK-BACK VALVE

(71) Applicant: Surpass Industry Co., Ltd., Saitama (JP)

(72) Inventor: Atsushi Inoue, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 0 days.

(21) Appl. No.: 16/863,921

(22) Filed: Apr. 30, 2020

(65) Prior Publication Data
US 2020/0355291 A1 Nov. 12, 2020

(30) Foreign Application Priority Data
May 10, 2019 (JP) .............................. JP2019-089538

(51) Int. Cl.
*F16K 1/36* (2006.01)
*F16K 31/143* (2006.01)
*F16K 41/10* (2006.01)
*F16K 29/00* (2006.01)

(52) U.S. Cl.
CPC .............. *F16K 1/36* (2013.01); *F16K 31/143* (2013.01); *F16K 41/103* (2013.01); *F16K 29/00* (2013.01)

(58) Field of Classification Search
CPC ...... F16K 31/143; F16K 41/103; F16K 41/10; F16K 1/36
USPC ........................................................ 251/63.5
See application file for complete search history.

(56) References Cited

U.S. PATENT DOCUMENTS

| 3,709,431 A | 1/1973 | Channell et al. |
| 5,178,304 A | 1/1993 | Torterotot |
| 6,270,055 B1 | 8/2001 | Szeteli et al. |
| 8,251,345 B2 | 8/2012 | Inoue |
| 8,602,383 B2 * | 12/2013 | Inoue ..................... F16K 23/00 251/63.5 |

(Continued)

FOREIGN PATENT DOCUMENTS

JP 2009068568 A 4/2009

OTHER PUBLICATIONS

European Search Report for International Application No. 18212044, filed Dec. 12, 2018, entitled "Valve". dated Apr. 10, 2019.

(Continued)

*Primary Examiner* — Kevin L Lee
(74) *Attorney, Agent, or Firm* — Hamilton, Brook, Smith & Reynolds, P.C.

(57) ABSTRACT

To prevent a defect in which particles such as impurities flow into a liquid that flows in from an inlet flow path and discharged from an outlet flow path. Provided is a suck-back valve including: a housing part; a valve element part; a diaphragm part; an open-close mechanism that brings the valve element part and a valve seat part into contact or separates the valve element part and the valve seat part from each other to switch between a closed state and an open state; and a suck-back mechanism that moves the diaphragm part in a direction in which the diaphragm part separates from the valve seat part to increase a volume of a valve chamber. The valve element part and the diaphragm part are molded integrally, the open-close mechanism is disposed in an adjacent space, and the valve element part and the open-close mechanism are coupled in the adjacent space.

5 Claims, 9 Drawing Sheets

(56) References Cited

U.S. PATENT DOCUMENTS

| | | | |
|---|---|---|---|
| 2005/0006609 A1* | 1/2005 | Fukano | F16K 31/1225 251/63.5 |
| 2006/0145107 A1* | 7/2006 | Masamura et al. | F16K 7/14 251/63.5 |
| 2010/0230626 A1 | 9/2010 | Inoue | |
| 2012/0175001 A1* | 7/2012 | Nishio etal | F16K 31/1262 137/625.33 |
| 2019/0186647 A1* | 6/2019 | Igarashi | F16K 23/00 |

OTHER PUBLICATIONS

Non-Final Office Action for U.S. Appl. No. 16/201,147, filed Nov. 27, 2018, entitled "Valve." dated Feb. 10, 2020.
Final Office Action for U.S. Appl. No. 16/201,147, filed Nov. 27, 2018, entitled "Valve." dated Jun. 18, 2020.
Notice of Allowance for U.S. Appl. No. 16/201,147, filed Nov. 27, 2018, entitled "Valve." dated Sep. 17, 2020.

* cited by examiner

SUCK-BACK VALVE

CROSS-REFERENCE TO RELATED APPLICATIONS

This application claims priority under 35 U.S.C. § 119 or 365 to Japanese, Application No. 2019-089538, filed May 10, 2019. The entire teachings of the above application are incorporated herein by reference.

BACKGROUND OF THE INVENTION

1. Field of the Invention

The present invention relates to a suck-back valve.

2. Description of Related Art

Among open-close valves each installed in a pipe through which a liquid such as a chemical solution circulates, there has been known a valve that performs a suck-back operation to prevent dripping that may occur during a full-close operation (e.g., see Japanese Unexamined Patent Application, Publication No. 2009-68568).

A suck-back valve disclosed in Japanese Unexamined Patent Application, Publication No. 2009-68568 performs operations in two stages which are a valve closing operation stage of moving a valve element to a fully closed position and a suck-back operation stage of increasing a space volume of a suck-back chamber.

BRIEF SUMMARY OF THE INVENTION

In the suck-back valve disclosed in Japanese Unexamined Patent Application, Publication No. 2009-68568, the valve element, which comes into close contact with a seat part provided in a valve body to bring a fluid flow path into a fully closed state, and a base of a diaphragm, which separates the valve element from the suck-back chamber, are coupled to each other by screwing in the internal space of the valve body. The internal space of the valve body is a space where the liquid circulates, and hence there is a possibility that particles present in a coupling part of the valve element and the base of the diaphragm flow into the liquid. Here, the particles refer to, for example, particles of raw materials produced during manufacturing or minute particles such as impurities contained in a liquid having circulated in the past.

The present invention has been made in view of such circumstances, and an object of the present invention is to provide a suck-back valve capable of preventing a defect in which particles such as impurities flow into a liquid that flows in from an inlet flow path and is discharged from an outlet flow path.

For solving the above problem, the present invention adopts the following means: a suck-back valve according to one aspect of the present invention including: a housing part internally formed with an inlet flow path into which a liquid flows, a valve chamber, an outlet flow path that allows the liquid, led from the valve chamber, to flow to an outside, and a valve hole that leads the liquid from the inlet flow path to the outlet flow path; a valve element part that comes into contact with or separates from a valve seat part disposed around the valve hole to bring the valve hole into a closed state or an open state; a diaphragm part that is attached to the housing part and isolates the valve chamber and an adjacent space, adjacent to the valve chamber, from each other; an open-close mechanism that brings the valve element part and the valve seat part into contact or separates the valve element part and the valve seat part from each other to switch between the closed state and the open state; and a suck-back mechanism that moves the diaphragm part in a direction in which the diaphragm part separates from the valve seat part, while maintaining the closed state where the valve element part is in contact with the valve seat part, to increase a volume of the valve chamber. The valve element part and the diaphragm part are molded integrally, the open-close mechanism is disposed in the adjacent space, and the valve element part and the open-close mechanism are coupled in the adjacent space.

According to the suck-back valve of one aspect of the present invention, the open-close mechanism switches the state where the valve element part and the valve seat part are separated to the state where the valve element part and the valve seat part are in contact, so that the valve hole for leading the liquid from the inlet flow path into the valve chamber switches from the open state to a closed state. Thereafter, the suck-back mechanism moves the diaphragm part in the direction in which the diaphragm part separates from the valve seat part, while maintaining the closed state, whereby the volume of the valve chamber increases. A suck-back operation is performed where the liquid in the outlet flow path is sucked due to the increase in the volume of the valve chamber, and hence dripping which occurs during full-close operation can be prevented.

Then, according to the suck-back valve of one aspect of the present invention, the valve element part and the diaphragm part are molded integrally, so that it is possible to prevent a defect in which particles such as impurities flow into a liquid, as compared to a case where a portion coupling the valve element part and the diaphragm part is disposed in a region in which a liquid circulates. The open-close mechanism is disposed in the adjacent space, and the valve element part and the open-close mechanism are coupled in the adjacent space. Therefore, as compared to the case of coupling the valve element part and the open-close mechanism in the region where the liquid circulates, it is possible to prevent the defect in which particles such as impurities flow into the liquid.

According to the suck-back valve of one aspect of the present invention, the valve chamber in which the valve element part is disposed is used as a space to increase the volume for the suck-back operation. Therefore, as compared to a case where the space for the suck-back operation is provided separately from the valve chamber, the volume of the space for accommodating the liquid is reduced, thereby improving the replaceability of the liquid. With the improvement in the replaceability of the liquid, it is possible to prevent a defect in which a part of the liquid in the suck-back valve stays without being replaced.

In the suck-back valve according to one aspect of the present invention, it is preferable that the valve element part have a circular valve element surface moved along the axis by the open-close mechanism and disposed on a plane orthogonal to the axis, the valve seat part have a circular valve seat surface disposed on a plane orthogonal to the axis and having a radial width, orthogonal to the axis, longer than a radial width of the valve element surface, and the valve element surface and the valve seat surface come into contact in the closed state to form a circular seal region.

When the valve hole is brought into the closed state, the circular valve element surface of the valve element part and the circular valve seat surface of the valve seat part come into contact to form the circular seal region. The valve element surface and the valve seat surface in contact with each other are each a surface disposed on a plane orthogonal to the axis, and sharp corners are not brought into contact, whereby the generation of the particles is prevented while the contact portion is not shaved even when the contact and the separation are repeated.

In the suck-back valve according to one aspect of the present invention, it is preferable that the diaphragm part include a base that is coupled to the suck-back mechanism, and a bellows part that couples between the base and the valve element part and in which a valley adjacent to a peak is formed, the valve element part be formed in a cylindrical shape extending along the axis, and a lower end part of the bellows part be connected to the valve element part in a connection position coinciding with an outer peripheral surface of the valve element part.

The valve element part is formed in a cylindrical shape extending along the axis, and the lower end part of the bellows part is connected to the valve element part in the connection position coinciding with the outer peripheral surface of the valve element part. Therefore, the entire region from the valley to the peak of the bellows part is present in the moving direction of the liquid that flows from the valve hole into the valve chamber and flows along the outer peripheral surface of the cylindrical valve element part. It is thus possible to prevent a defect in which the liquid stays in the vicinity of the valley of the bellows part and particles such as impurities are accumulated.

In the suck-back valve according to one aspect of the present invention, the bellows part is preferably obtained by forming a pair of the valleys adjacent to a single one of the peaks.

With the bellows part having only a single peak, a large region for the stay is not formed in the valley sandwiched between a pair of peaks. It is thus possible to further prevent the defect in which the liquid stays in the vicinity of the valley of the bellows part and particles such as impurities are accumulated.

In the suck-back valve according to one aspect of the present invention, it is preferable that the open-close mechanism include an axial member that is accommodated in the housing part movably along the axis, has one end coupled to the valve element part, and receives an urging force in a direction in which the valve element part is separated from the valve seat part by pressure of a fluid introduced from the outside, and a first urging force generation part that transmits to the axial member an urging force in a direction in which the valve element part is brought closer to the valve seat part.

On the axial member included in the open-close mechanism, the urging force acts in the direction in which the valve element part is separated from the valve seat part by the pressure of the fluid introduced from the outside, and the urging force acts, by the first urging force generation part, in the direction in which the valve element part is brought closer to the valve seat part. When the urging force in the direction in which the valve element part is separated from the valve seat part exceeds the urging force in the direction in which the valve element part is brought closer to the valve seat part, the valve hole switches from the closed state to the open state. According to such a suck-back valve, by adjusting the pressure generated by the fluid introduced from the outside, it is possible to actuate the valve element part independently of the operation of the diaphragm part, and switch between the closed state where the valve element part is in contact with the valve seat part and the open state where the valve element part and the valve seat part are separated from each other.

In the suck-back valve with the above configuration, it is preferable that the suck-back mechanism include a tubular member that is accommodated in the housing part movably along the axis, has one end coupled to the diaphragm part, and receives an urging force in a direction in which the diaphragm part is brought closer to the valve seat part by pressure of a fluid introduced from the outside, and a second urging force generation part that transmits to the tubular member an urging force in a direction in which the diaphragm part is separated from the valve seat part, and the tubular member accommodate the axial member along the inner peripheral surface movably along the axis.

On the tubular member included in the suck-back mechanism, the urging force acts in the direction in which the diaphragm part is brought closer to the valve seat part by the pressure generated by the fluid introduced from the outside, and the urging force acts, by the second urging force generation part, in the direction in which the diaphragm part is separated from the valve seat part. When the urging force in the direction in which the diaphragm part is separated from the valve seat part exceeds the urging force in the direction in which the diaphragm part is brought closer to the valve seat part, the volume of the valve chamber increases. According to such a suck-back valve, by adjusting the pressure generated by the fluid introduced from the outside, it is possible to actuate the diaphragm part independently of the operation of the valve element part, increase the volume of the valve chamber, and perform a suck-back operation for sucking the liquid in the outlet flow path into the valve chamber.

According to the present invention, it is possible to provide a suck-back valve capable of preventing the defect in which particles such as impurities flow into the liquid that flows in from the inlet flow path and is discharged from the outlet flow path.

DETAILED DESCRIPTION OF THE INVENTION

Figure 1:
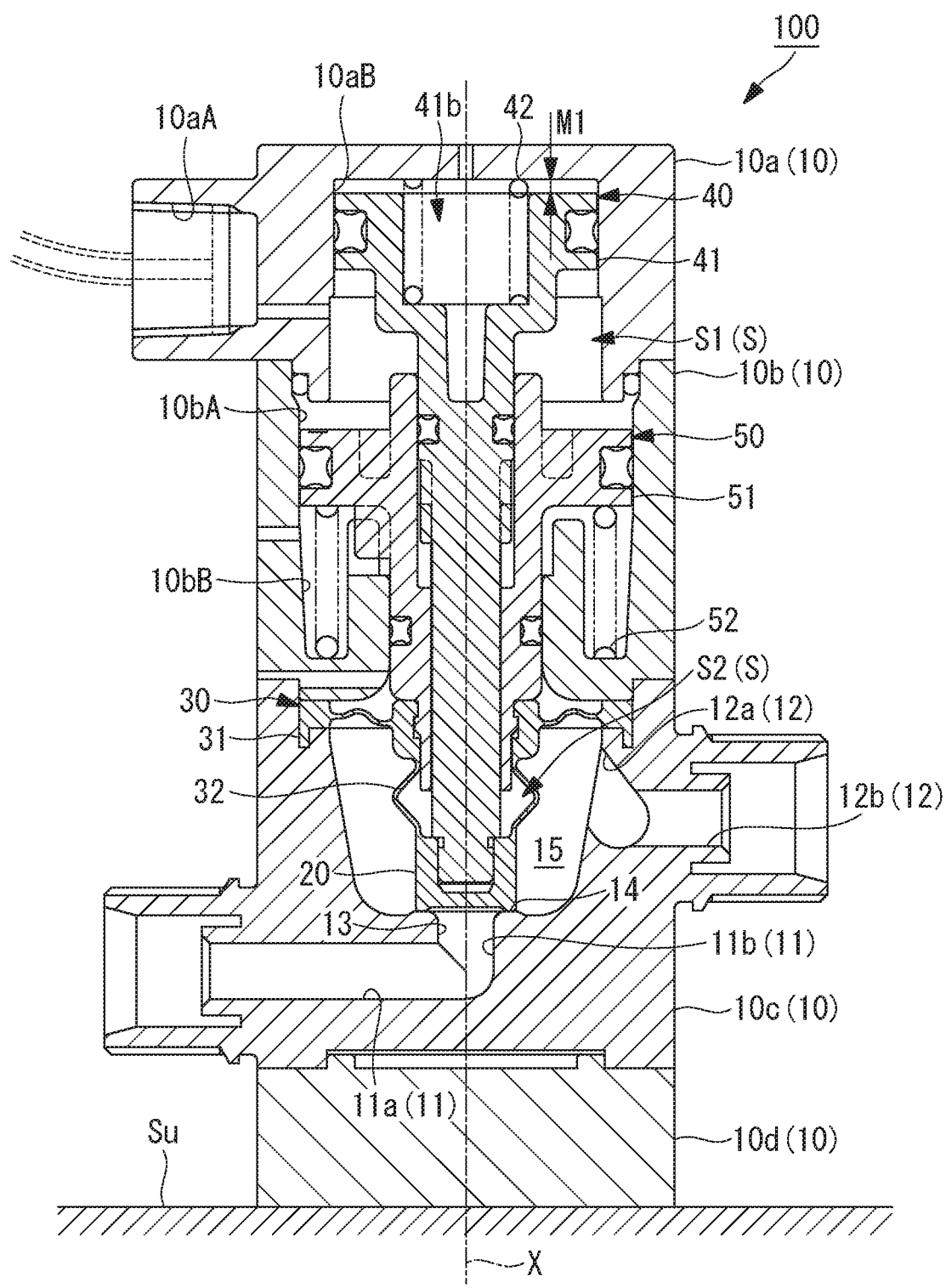
FIG. 1 is a longitudinal sectional view showing a closed state of a suck-back valve according to one embodiment of the present invention.
Figure 2:
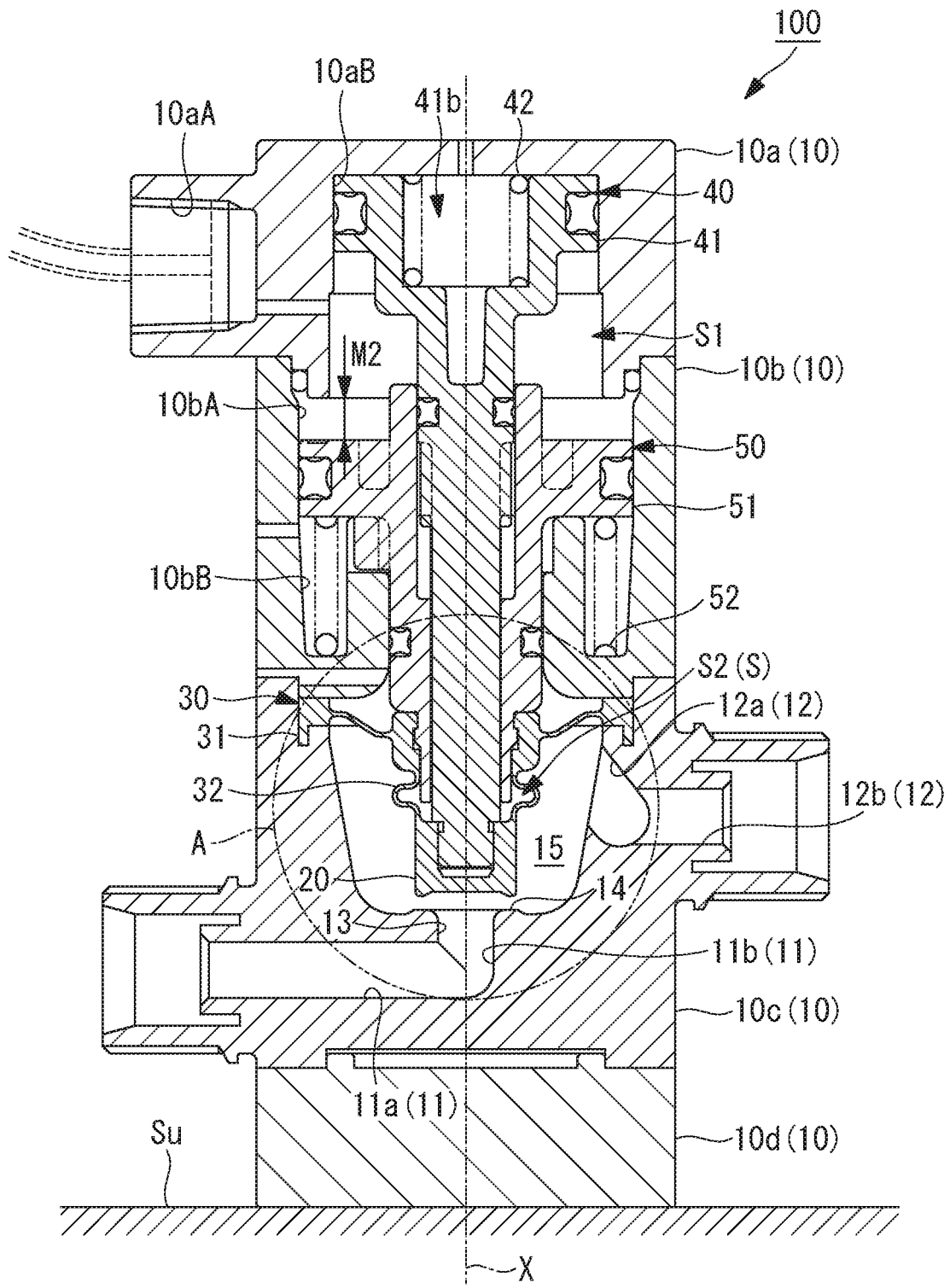
FIG. 2 is a longitudinal sectional view showing an open state of the suck-back valve according to one embodiment of the present invention.
Figure 3:
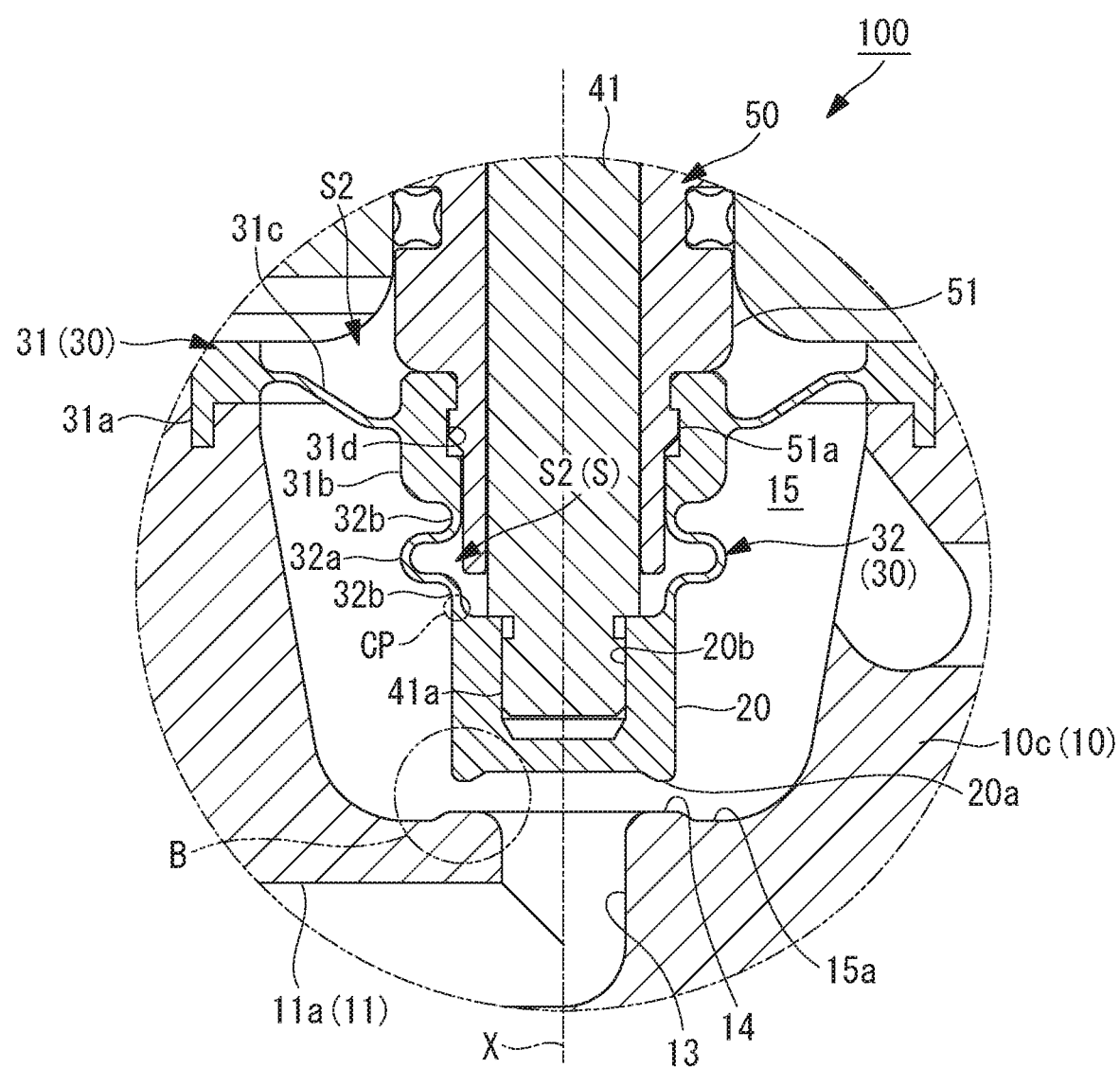
FIG. 3 is a partially enlarged view of a portion A in FIG. 2.
Figure 4:
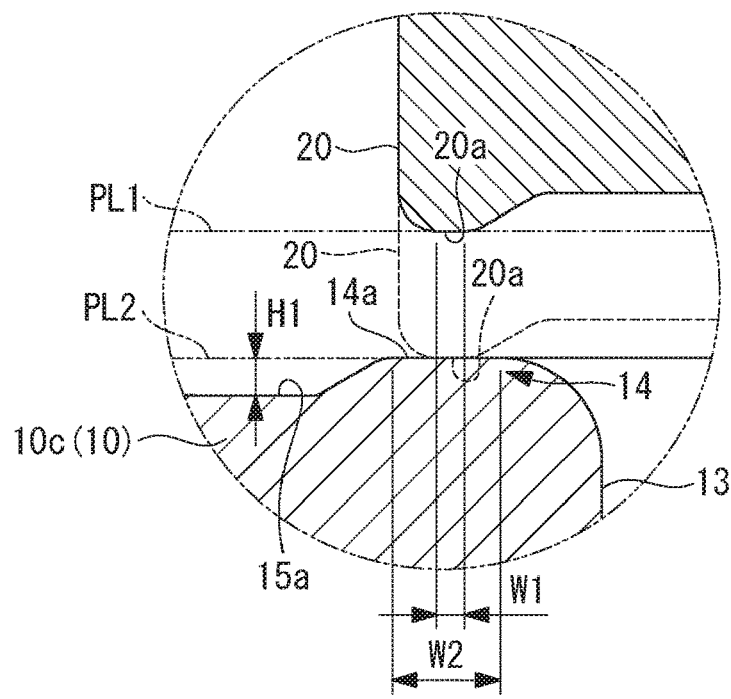
FIG. 4 is a partially enlarged view of a portion B in FIG. 3.
Figure 5:
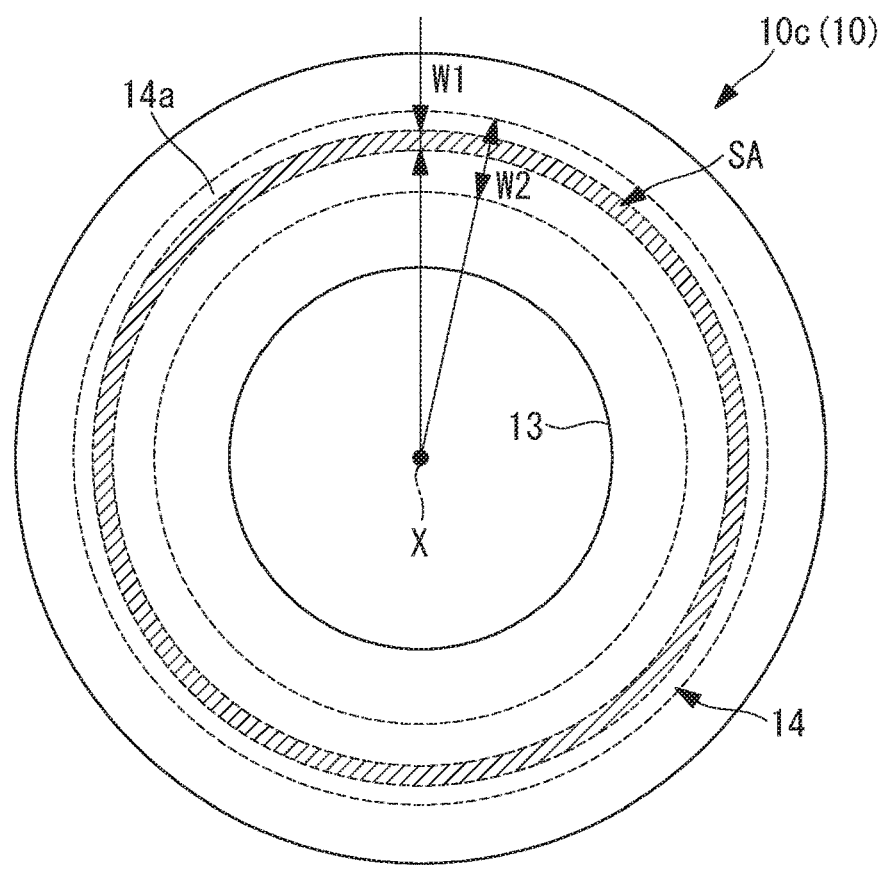
FIG. 5 is a plan view of a valve hole shown in FIG. 3, seen from above along an axis.
Figure 6:
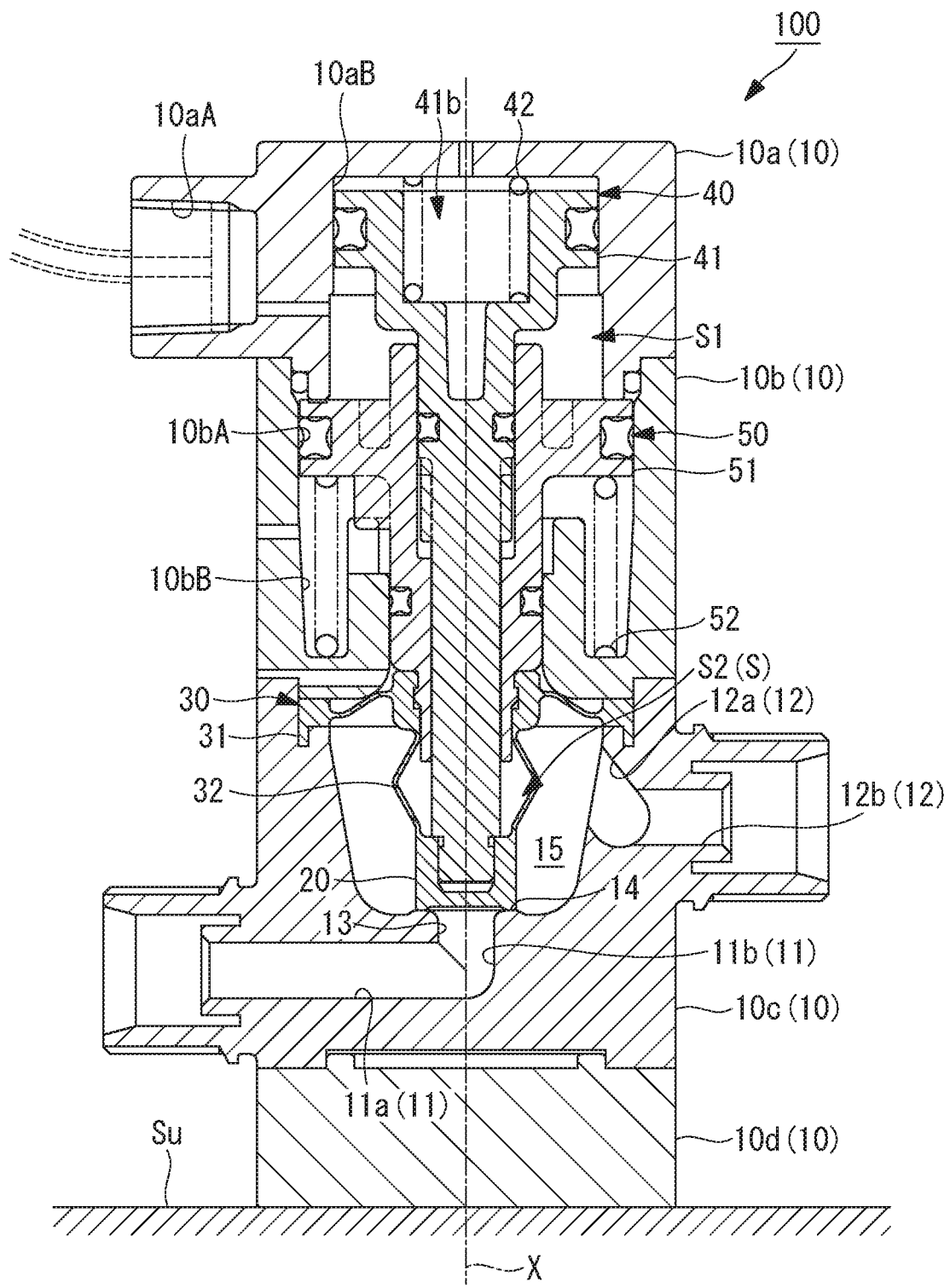
FIG. 6 is a longitudinal sectional view showing a state where a suck-back operation of the suck-back valve shown in FIG. 1 has been completed.

Hereinafter, a suck-back valve according to one embodiment of the present invention will be described with reference to the drawings. FIG. 1 is a longitudinal sectional view showing a fully closed state of a suck-back valve 100, and FIG. 2 is a longitudinal sectional view showing a fully open state of the suck-back valve 100. FIG. 3 is a partially enlarged view showing a portion A in FIG. 2. FIG. 4 is a partially enlarged view of a portion B shown in FIG. 3. FIG. 5 is a plan view of a valve hole 13 shown in FIG. 3, seen from above along an axis X; FIG. 6 is a longitudinal sectional view showing a state where the suck-back operation of the suck-back valve 100 has been completed.

The suck-back valve 100 of the present embodiment is installed in a flow path where a liquid such as a chemical solution, used for a semiconductor manufacturing device, is allowed to flow. The suck-back valve 100 has a suck-back function to prevent dripping during the full-close. The suck-back valve 100 of the present embodiment is provided with a housing part 10, a valve element part 20, a diaphragm part 30, an open-close mechanism 40, and a suck-back mechanism 50.

The housing part 10 is a casing that internally accommodates the valve element part 20, the diaphragm part 30, the open-close mechanism 40, and the suck-back mechanism 50. The housing part 10 includes a first housing 10a, a second housing 10b, a third housing 10c, and a fourth housing 10d. The third housing 10c is formed using a fluorine resin material (e.g., polytetrafluoroethylene (PTFE), modified PTFE, p-fluorophenylalanine (PFA)).

The first housing 10a and the second housing 10b form, in a combined state, an accommodation space (adjacent space) S for internally accommodating the open-close mechanism 40 and the suck-back mechanism 50. The accommodation space S includes a pressure chamber S1 and a coupling space S2 to be described later. The third housing 10c, with the diaphragm part 30 attached thereto, forms a valve chamber 15 that accommodates the valve element part 20. The first housing 10a, the second housing 10b, the third housing 10c, and the fourth housing 10d come into a coupled state by inserting a fastening bolt (not shown) into a through hole of each housing and fastening the bolt to a fastening nut.

The first housing 10a is a casing disposed in the uppermost position. The first housing 10a is formed with an introduction port 10aA into which compressed air (fluid) is introduced from an external compressed-air supply source (not shown), and an insertion hole 10aB into which the open-close mechanism 40 is inserted movably.

The second housing 10b is a casing disposed below the first housing 10a. The second housing 10b is formed with a through hole 10bA into which the suck-back mechanism 50 is movably inserted, and a holding hole 10bB in which a spring 52 is held. A pressure chamber S1 is formed between the first housing 10a and the second housing 10b, the chamber being a space where the compressed air is introduced from the introduction port 10aA, and the open-close mechanism 40 and the suck-back mechanism 50 are disposed.

The pressure chamber S1 is a space defined by the inner peripheral surfaces of an axial member 41 and a tubular member 51, which will be described later, and the housing part 10. By the pressure of the compressed air introduced into the pressure chamber S1, an urging force acting upward in the axis X is applied to the axial member 41, and an urging force acting downward in the axis X is applied to the tubular member 51.

The third housing 10c is a casing disposed below the second housing 10b. The third housing 10c is internally formed with an inlet flow path 11, an outlet flow path 12, a valve hole 13, a valve seat part 14, and the valve chamber 15. The inner peripheral surface of each of the inlet flow path 11, the outlet flow path 12, the valve hole 13, the valve seat part 14, and the valve chamber 15 has been processed to have an average roughness of 0.6a or less by cutting or molding.

The inlet flow path 11 is a flow path into which the liquid flows from an external pipe (not shown). The inlet flow path 11 is a flow path formed by coupling between a first inlet flow path part 11a which leads the liquid, from the external pipe, parallel to the installation surface Su and a second inlet flow path 11b which extends along the axis X orthogonal to the installation surface Su. The liquid having flowed into the first inlet flow path part 11a bends 90 degrees in a direction along the axis X of the housing part 10 at the position of the axis X and is led from the second inlet flow path 11b to the valve hole 13.

The outlet flow path 12 is a flow path for flowing out the liquid, led from the valve chamber 15, into an external pipe (not shown). The outlet flow path 12 is a flow path formed by coupling between a first outlet flow path part 12a which extends downward from the vicinity of the upper end in the axis-X direction of the valve chamber 15 and a second outlet flow path part 12b which leads the liquid, into the external pipe, parallel to the installation surface Su. The liquid having flowed from the valve chamber 15 into the first outlet flow path part 12a is led from the second outlet flow path part 12b into the external pipe.

The outlet flow path 12 is a flow path open toward the upper end in the axis-X direction of the valve chamber 15 and inclined downward toward the second outlet flow path part 12b. With the outlet flow path 12 being open toward the upper end of the valve chamber 15, a defect in which the liquid of the valve chamber 15 stays in the vicinity of the upper end of the valve chamber 15 is prevented, and the replaceability is improved.

The valve hole 13 is a through hole extending along the axis X while leading the liquid from the inlet flow path 11 into the valve chamber 15. The valve seat part 14 is a portion disposed around the valve hole 13 and configured to bring the valve hole 13 into the closed state or the open state by the valve element part 20 coming into contact or separating from the valve seat part 14.

The valve chamber 15 is a space for accommodating the liquid flowing in from the valve hole 13 and has a circular shape in the cross section orthogonal to the axis X As shown in FIG. 3, an inner diameter of the valve chamber 15 in the vicinity of the diaphragm part 30 (the upper end in the axis-X direction) is larger than an inner diameter of the valve chamber 15 in the vicinity of the valve seat part 14 (the lower end in the axis-X direction). The inner peripheral surface of the valve chamber 15 has a tapered shape in which its inner diameter gradually expands from the lower end toward the upper end along the axis X.

The diameter of the valve chamber 15 at the lower end in the axis-X direction has been made small so that the volume of the valve chamber 15 is decreased to improve the replaceability of the liquid. The diameter of the valve chamber 15 at the upper end in the axis-X direction has been made large so that the outer diameter of the thin film part 31c of the diaphragm part 30 is made large to increase the variation in the volume of the valve chamber 15 for displacement in the axis-X direction and thereby to increase the variation in volume made by the suck-back mechanism 50.

The fourth housing 10d is a casing disposed below the third housing 10c and disposed in the lowermost position. The fourth housing 10d is attached to the installation surface Su with a fastening bolt (not shown).

The valve element part 20 is moved along the axis X by the open-close mechanism 40, and comes into contact with or separates from the valve seat part 14 disposed around the valve hole 13 to bring the valve hole 13 into the open state or the closed state. As shown in FIGS. 1 to 3, the valve element part 20 is accommodated in the valve chamber 15 formed in the third housing 10c. As shown in FIG. 3, the valve element part 20 is formed in a cylindrical shape extending along the axis X.

The valve element part 20 brings a valve element surface 20a, formed annularly around the axis X at the outer peripheral end of the lower end, into contact with a valve seat surface 14a of the valve seat part 14 disposed on the plane orthogonal to the axis X to form a circular seal region SA, thus bringing the valve hole 13 into the closed state. Each of the valve element surface 20a and the valve seat surface 14a has been processed to have an average roughness of 0.1a or less by cutting, grinding, or molding.

FIG. 4 is a partially enlarged view of a portion B in FIG. 3. The valve element part 20 indicated by a solid line in FIG. 4 shows the open state where the valve element surface 20a is separated from the valve seat surface 14a. The valve element part 20 indicated by a dashed line in FIG. 4 shows the closed state where the valve element surface 20a is in contact with the valve seat surface 14a. FIG. 5 is a plan view of a valve hole 13 shown in FIG. 3, seen from above along an axis X;

As shown in FIGS. 4 and 5, the valve element part 20 has the circular valve element surface 20a that is disposed on a plane PL1 orthogonal to the axis X. The valve seat part 14 has the circular valve seat surface 14a that is disposed on a plane PL2 orthogonal to the axis X. The valve seat surface 14a is disposed at a position higher than a bottom surface 15a of the valve chamber 15 by a height H1 along the axis-X direction The radial width of the valve element surface 20a orthogonal to the axis X is W1, the radial width of the valve seat surface 14a orthogonal to the axis X is W2. As shown in FIGS. 4 and 5, the radial width W2 of the valve seat surface 14a is longer than the radial width W1 of the valve element surface 20a.

As indicated by the dashed line in FIG. 4, when the closed state is entered where the valve element surface 20a is in contact with the valve seat surface 14a, the entire region of the valve element surface 20a comes into the state of being in contact with the valve seat surface 14a. A seal region SA shown in FIG. 5 shows the entire region of the valve element surface 20a in contact with the valve seat surface 14a. The seal region SA is formed on the entire periphery surrounding the valve hole 13 to block the liquid flowing from the valve hole 13 into the valve chamber 15.

The diaphragm part 30 is a member attached to the housing part 10 in the state of being sandwiched between the second housing 10b and the third housing 10c. The diaphragm part 30 isolates the valve chamber 15 and the accommodation space S, adjacent to the valve chamber 15, from each other. As described above, the accommodation space S is the inner space of the housing part 10 and the space for accommodating the open-close mechanism 40 and the suck-back mechanism 50.

As shown in FIG. 3, the diaphragm part 30 includes a base 31 coupled to the tubular member 51 of the suck-back mechanism 50, and a bellows part 32 coupled to the valve element part 20. The diaphragm part 30 is a member molded integrally with the valve element part 20 by using a fluorine resin material (e.g., PTFE). A portion of the diaphragm part 30 in contact with the liquid has been processed to have an average roughness 0.6a or less by cutting or molding.

As shown in FIG. 3, the base 31 includes a circular outer periphery 31a held in the state of being sandwiched between the second housing 10b and the third housing 10c, a circular inner periphery 31b coupled to the outer peripheral surface of the tubular member 51 of the suck-back mechanism 50, and a thin film part 31c in a thin-film shape connecting between the inner peripheral end of the outer periphery 31a and the outer peripheral end of the inner periphery 31b.

As shown in FIG. 3, the bellows part 32 is a member formed with a single peak 32a protruding to the outer peripheral side with the axis X at the center, and a pair of valleys 32b disposed in an upper part and a lower part which are adjacent to the peak 32a, the member being extendable along the axis X. The lower end of the bellows part 32 is connected to the valve element part 20 at a connection position CP radially coinciding with the position of the outer peripheral surface of the valve element part 20. The valley 32b of the bellows part 32 is disposed at the same position as the connection position CP in the radial direction orthogonal to the axis X.

The open-close mechanism 40 is a mechanism that brings the valve element part 20 and the valve seat part 14 into contact or separates those parts from each other to switch between the closed state and the open state. The open-close mechanism 40 includes the axial member 41 formed in an axial shape along the axis X, and a spring (first urging force generation part) 42 that transmits to the axial member 41 an urging force in a direction in which the valve element part 20 is brought closer to the valve seat part 14.

The axial member 41 is a member accommodated in the housing part 10 movably along the axis X. As shown in FIG. 3, a male screw 41a is formed on the outer peripheral surface of the lower end of the axial member 41. The male screw 41a is fastened to a female screw 20b formed on the inner peripheral surface of the valve element part 20. The lower end of the axial member 41 is coupled to the valve element part 20 by fastening the male screw 41a to the female screw 20b.

As shown in FIG. 3, a coupling portion made up of the male screw 41a and the female screw 20b that couple between the axial member 41 of the open-close mechanism 40 and the valve element part 20 is disposed in the coupling space S2. The coupling space S2 is a space included in the accommodation space S described above and a space isolated from the valve chamber 15 in which the liquid circulates. In the coupling portion made up of the male screw 41a and the female screw 20b, particles such as particles of raw materials generated during manufacturing are present, and hence the particles are mixed into the liquid when the liquid flows into the coupling portion. In the present embodiment, the coupling portion is disposed in the coupling space S2 in which the liquid does not circulate, rather than a region in which the liquid circulates such as the valve chamber 15. Therefore, particles such as particles of raw materials generated during manufacturing are not mixed into the liquid.

The axial member 41 receives an upward urging force acting upward in the axis X, from the pressure of the compressed air introduced from the introduction port 10aA into the pressure chamber S1. This upward urging force is an urging force in the direction in which the valve element part 20 is separated from the valve seat part 14. The axial member 41 receives from the spring 42 a downward urging force acting downward in the axis X. This downward urging force is an urging force in the direction in which the valve element part 20 is brought closer to the valve seat part 14. The axial member 41 moves downward along the axis X when the downward urging force exceeds the upward urging force, and the axial member 41 moves upward along the axis X when the upward urging force exceeds the downward urging force.

The spring 42 is an elastic member accommodated in a recess 41b provided at the upper end of the axial member 41 and configured to transmit the downward urging force acting downward in the axis X to the axial member 41. The downward urging force transmitted by the spring 42 to the axial member 41 is used as motive power to bring the valve hole 13 into the closed state.

The suck-back mechanism 50 is a mechanism for moving the diaphragm part 30 in a direction in which the diaphragm part 30 separates from the valve seat part 14, while maintaining the closed state where the valve element part 20 is in contact with the valve seat part 14. The suck-back mechanism 50 moves the diaphragm part 30 in the direction in which the diaphragm part 30 separates from the valve seat part 14, to increase the volume of the valve chamber 15 and suck the liquid from the outlet flow path 12 into the valve chamber 15.

The suck-back mechanism 50 includes a tubular member 51 formed in a tubular shape along the axis X, and a spring (second urging force generation part) 52 that transmits to the tubular member 51 an urging force in a direction in which the diaphragm part 30 is separated from the valve seat part 14.

The tubular member 51 is a member accommodated in the housing part 10 movably along the axis X. The tubular member 51 has an inner peripheral surface that accommodates the axial member 41 movably along the axis X. The axial member 41 can move on the axis along the inner peripheral surface of the tubular member 51. Because the axial member 41 is disposed on the inside and the tubular member 51 is disposed on the outside as thus described, each of the axial member 41 and the tubular member 51 can independently move along the axis X.

As shown in FIG. 3, a protrusion 51a protruding radially outward is formed on the outer peripheral surface of the lower end of the tubular member 51. The protrusion 51a is inserted into a groove 31d formed on the inner peripheral surface of the inner periphery 31b of the diaphragm part 30. By inserting the protrusion 51a into the groove 31d, the lower end of the tubular member 51 is coupled to the diaphragm part 30.

The tubular member 51 receives a downward urging force acting downward in the axis X, from the pressure of the compressed air introduced from the introduction port 10aA into the pressure chamber S1. This downward urging force is an urging force in the direction in which the diaphragm part 30 is brought closer to the valve seat part 14. The tubular member 51 receives from the spring 52 an upward urging force acting upward in the axis X. This upward urging force is an urging force in the direction in which the diaphragm part 30 is separated from the valve seat part 14. The tubular member 51 moves downward along the axis X when the downward urging force exceeds the upward urging force, and the tubular member 51 moves upward along the axis X when the upward urging force exceeds the downward urging force.

The spring 52 is an elastic member that is held in the holding hole 10bB of the second housing 10b and transmits the upward urging force acting upward in the axis X to the tubular member 51. The upward urging force transmitted to the tubular member 51 by the spring 52 is used as motive power that increases the volume of the valve chamber 15 after bringing the valve hole 13 into the closed state.

Next, the operation of the suck-back valve 100 of the present embodiment will be described.

First, the closed state of the suck-back valve 100 will be described.

When the downward urging force transmitted from the spring 42 to the axial member 41 is larger than the upward urging force applied from the pressure chamber S1 to the axial member 41, the suck-back valve 100 is maintained in the closed state shown in FIG. 1. In the closed state shown in FIG. 1, the valve element part 20 comes into contact with the valve seat part 14 by the downward urging force transmitted from the spring 42 to the axial member 41 to bring the valve hole 13 into the closed state.

Next, the open state of the suck-back valve 100 will be described.

When the upward urging force applied from the pressure chamber S1 to the axial member 41 exceeds the downward urging force transmitted from the spring 42 to the axial member 41, the suck-back valve 100 comes into the open state shown in FIG. 2. In the open state shown in FIG. 2, the upward urging force transmitted from the pressure chamber S1 to the axial member 41 exceeds the downward urging force transmitted from the spring 42 to the axial member 41, and the valve element part 20 separates from the valve seat part 14 to bring the valve hole 13 into the open state.

Finally, the suck-back operation of the suck-back valve 100 will be described.

When the pressure of the pressure chamber S1 is reduced from the open state of the suck-back valve 100 shown in FIG. 2, the downward urging force transmitted from the spring 42 to the axial member 41 becomes larger than the upward urging force transmitted from the pressure chamber S1 to the axial member 41, and the valve element part 20 comes into contact with the valve seat part 14 to bring the valve hole 13 into the closed state shown in FIG. 1.

Thereafter, when the pressure of the pressure chamber S1 is further reduced, the upward urging force transmitted from the spring 52 to the tubular member 51 becomes larger than the downward urging force applied from the pressure chamber S1 to the tubular member 51, and the tubular member 51 moves upward. With the upward movement of the tubular member 51, the base 31 of the diaphragm part 30 moves in the direction in which the base 31 separates from the valve seat part 14.

When the base 31 moves further upward along the axis X, the thin film part 31c of the diaphragm part 30 rises with the extension of the bellows part 32, and the volume of the valve chamber 15 increases. When the volume of the valve chamber 15 increases, the liquid is sucked from the outlet flow path 12 into the valve chamber 15. Accordingly, the liquid is sucked from a pipe (not shown) connected to the outlet flow path 12 to the outlet flow path 12 side. This prevents the dripping in the pipe on the downstream of the outlet flow path 12.

Here, symbol M1 shown in FIG. 1 denotes the amount of movement in the axis-X direction of the axial member 41 until the state shifts from the open state where the valve element part 20 is separated from the valve seat part 14 to the closed state where the valve element part 20 is in contact from the valve seat part 14. Symbol code M2 shown in FIG.

2 denotes the amount of movement in the axis-X direction of the tubular member 51 until the state shifts from the open state to a suck-back state shown in FIG. 6 where the volume of the valve chamber 15 has increased. The movement amount M2 is larger than the movement amount M1. Hence the amount of the movement in the axis-X direction of the tubular member 51 until the state shifts from the open state to the suck-back state is larger than the amount of the movement in the axis-X direction of the axial member 41 until the state shifts from the open state to the closed state. Therefore, after the state shifts from the open state to the closed state, the tubular member 51 further moved upward in the axis-X direction, and the volume of the valve chamber 15 increases while the closed state is maintained.

A description will be given of actions and effects exerted by the suck-back valve 100 of the present embodiment described above.

According to the suck-back valve 100 of the present embodiment, the open-close mechanism 40 switches the state where the valve element part 20 and the valve seat part 14 are separated to the state where the valve element part 20 and the valve seat part 14 are in contact, so that the valve hole 13 for leading the liquid from the inlet flow path 11 to the valve chamber 15 switches from the open state to a closed state. Thereafter, the suck-back mechanism 50 moves the diaphragm part 30 in the direction in which the diaphragm part 30 separates from the valve seat part 14, while maintaining the closed state, whereby the volume of the valve chamber 15 increases. A suck-back operation is performed where the liquid in the outlet flow path 12 is sucked due to the increase in the volume of the valve chamber 15, and hence dripping which occurs during full-close operation can be prevented.

Then, according to the suck-back valve 100 of the present embodiment, the valve element part 20 and the diaphragm part 30 are molded integrally, so that it is possible to prevent a defect in which particles such as impurities flow into a liquid, as compared to a case where a portion coupling the valve element part and the diaphragm part is disposed in a region in which a liquid circulates. The open-close mechanism 40 is disposed in the accommodation space S, and the valve element part 20 and the open-close mechanism 40 are coupled in the coupling space S2 included in the accommodation space S. Therefore, as compared to the case of coupling the valve element part 20 and the open-close mechanism 40 in the region where the liquid circulates, it is possible to prevent the defect in which particles such as impurities flow into the liquid.

According to the suck-back valve 100 of the present embodiment, when the valve hole 13 is brought into the closed state, the circular valve element surface 20a of the valve element part 20 and the circular valve seat surface 14a of the valve seat part 14 come into contact to form the circular seal region SA. The valve element surface 20a and the valve seat surface 14a in contact with each other are each a surface disposed on a plane orthogonal to the axis X, and sharp corners are not brought into contact, whereby the generation of the particles is prevented while the contact portion is not shaved even when the contact and the separation are repeated.

According to the suck-back valve 100 of the present embodiment, the valve element part 20 is formed in a cylindrical shape extending along the axis X, and the lower end part of the bellows part 32 is connected to the valve element part 20 in the connection position CP coinciding with the outer peripheral surface of the valve element part 20. Therefore, the entire region from the valley 32b to the peak 32a of the bellows part 32 is present in the moving direction of the liquid that flows from the valve hole 13 into the valve chamber 15 and flows along the outer peripheral surface of the cylindrical valve element part 20.

It is thus possible to prevent a defect in which the liquid stays in the vicinity of the valley 32b of the bellows part 32 and particles such as impurities are accumulated. With the bellows part 32 having only a single peak 32a, a large region for the stay is not formed in the valley sandwiched between a pair of peaks. It is thus possible to further prevent the defect in which the liquid stays in the vicinity of the valley 32b of the bellows part 32 and particles such as impurities are accumulated.

According to the suck-back valve 100 of the present embodiment, on the axial member 41 included in the open-close mechanism 40, the upward urging force acts in the direction in which the valve element part 20 is separated from the valve seat part 14 by the pressure of the compressed air introduced from the outside, and the downward urging force acts, by the spring 42, in the direction in which the valve element part 20 is brought closer to the valve seat part 14. When the upward urging force in the direction in which the valve element part 20 is separated from the valve seat part 14 exceeds the downward urging force in the direction in which the valve element part 20 is brought closer to the valve seat part 14, the valve hole 13 switches from the closed state to the open state.

According to such a suck-back valve 100, by adjusting the pressure generated by the compressed air introduced from the outside, it is possible to actuate the valve element part 20 independently of the operation of the diaphragm part 30, and switch between the closed state where the valve element part 20 is in contact with the valve seat part 14 and the open state where the valve element part 20 and the valve seat part 14 are separated from each other.

According to the suck-back valve 100 of the present embodiment, on the tubular member 51 included in the suck-back mechanism 50, the downward urging force acts in the direction in which the diaphragm part 30 is brought into contact with the valve seat part 14 part by pressure generated by the compressed air introduced from the outside, and the upward urging force acts, by the spring 52, in the direction in which the diaphragm part 30 is separated from the valve seat part 14. When the upward urging force in the direction in which the diaphragm part 30 is separated from the valve seat part 14 exceeds the downward urging force in the direction in which the diaphragm part 30 is brought closer to the valve seat part 14, the volume of the valve chamber 15 increases.

According to such a suck-back valve 100, by adjusting the pressure generated by the compressed air introduced from the outside, it is possible to actuate the diaphragm part 30 independently of the operation of the valve element part 20, increase the volume of the valve chamber 15, and perform a suck-back operation for sucking the liquid in the outlet flow path 12 into the valve chamber 15.

Other Embodiments

Figure 7:
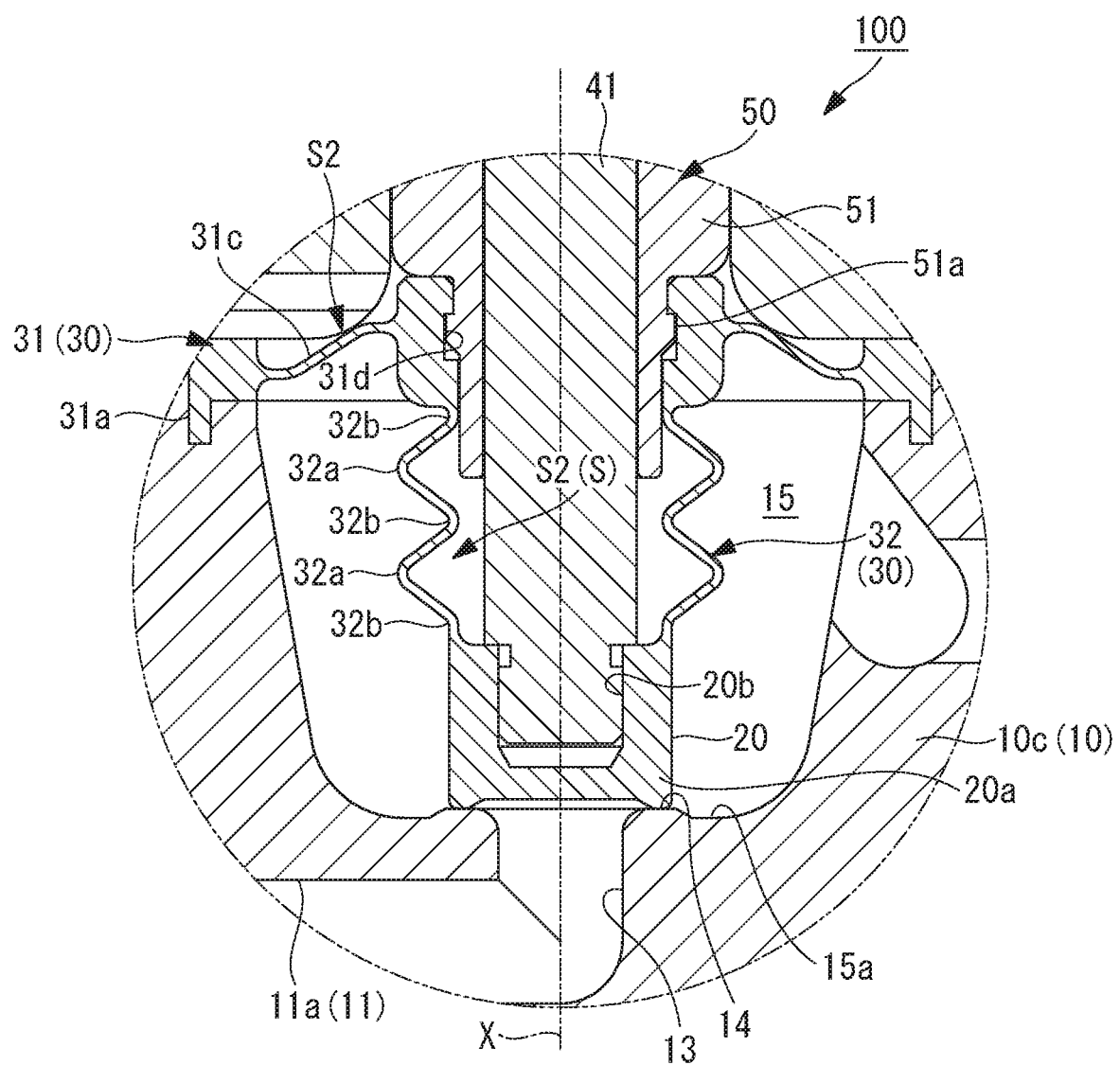
FIG. 7 is a partially enlarged view showing a closed state of a suck-back valve according to a first modification.

In the above description, the bellows part 32 has been obtained by forming the pair of valleys 32b adjacent to the single peak 32a, but another aspect may be employed. For example, as shown in a first modification of FIG. 7, the bellows part 32 may be obtained by forming a plurality of valleys 32b and a plurality of peaks 32a adjacent to those valleys 32. FIG. 7 is an example of providing two peaks 32a, but three or more peaks 32a may be provided.

By increasing the number of peaks 32*a*, the amount of deformation in the axis-X direction of one peak 32*a* is held low, so that it is possible to prevent a defect in which the diaphragm part 30 is excessively deformed and results in breakage. On the other hand, the bellows part 32 having a single peak 32*a* shown in FIG. 3 is advantageous, as compared to the case where a plurality of peaks 32*a* are provided, in being able to prevent a defect in which particles are accumulated in the valley 32*b* provided between the pair of peaks 32*a*.

Figure 8:
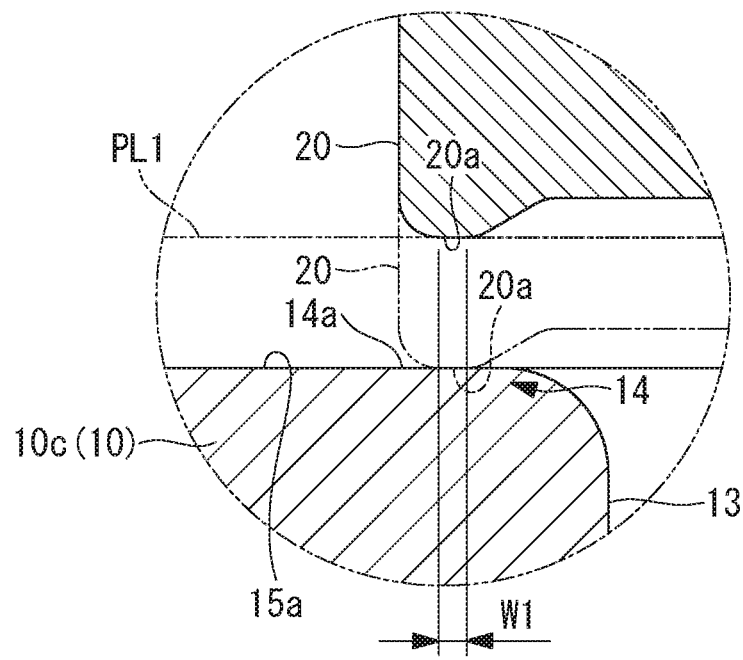
FIG. 8 is a partially enlarged view of a valve seat part of a suck-back valve according to a second modification.
Figure 9:
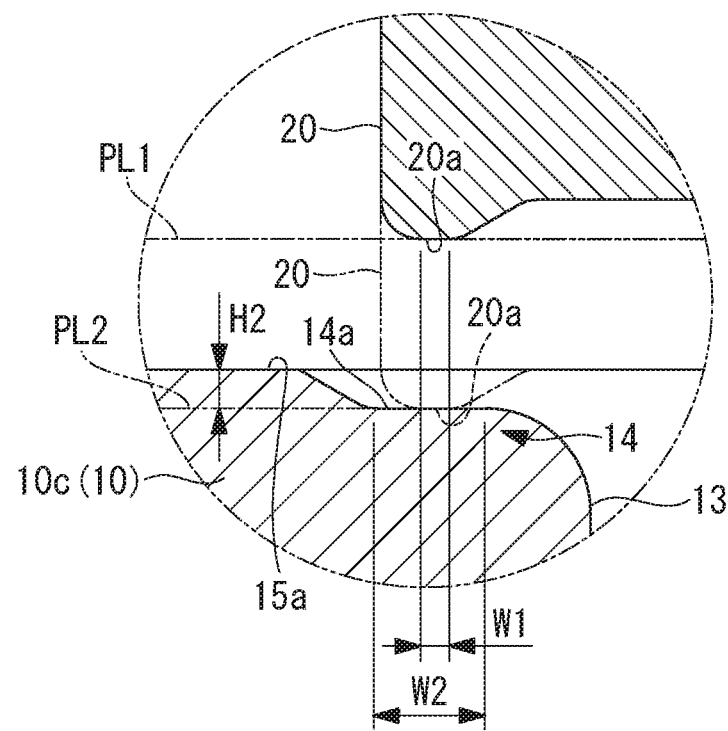
FIG. 9 is a partially enlarged view of a valve seat part of a suck-back valve according to a third modification.

In the above description, the valve seat surface 14*a* of the valve seat part 14 has been disposed at the position higher than the bottom surface 15*a* of the valve chamber 15 by the height H1 along the axis X, but another aspect may be employed. For example, as shown in a second modification of FIG. 8, the valve seat surface 14*a* of the valve seat part 14 may be disposed at the same position in the axis-X direction of the bottom surface 15*a* of the valve chamber 15. Further, for example, as shown in a third modification of FIG. 9, the valve seat surface 14*a* of the valve seat part 14 may be disposed at a position lower than the bottom surface 15*a* of the valve chamber 15 by a height H2 along the axis X.

In the above description, the open-close mechanism 40 includes the spring 42 that generates the downward urging force acting downward along the axis X to the axial member 41, but another aspect may be employed. For example, as shown in a fourth modification of FIG. 10, an introduction port 10*a*C, into which the compressed air is introduced from the external compressed-air supply source (not shown), may be formed in the first housing 10*a*, and the compressed air may be introduced into a pressure chamber S3 that transmits the downward urging force to the axial member 41.

Figure 10:
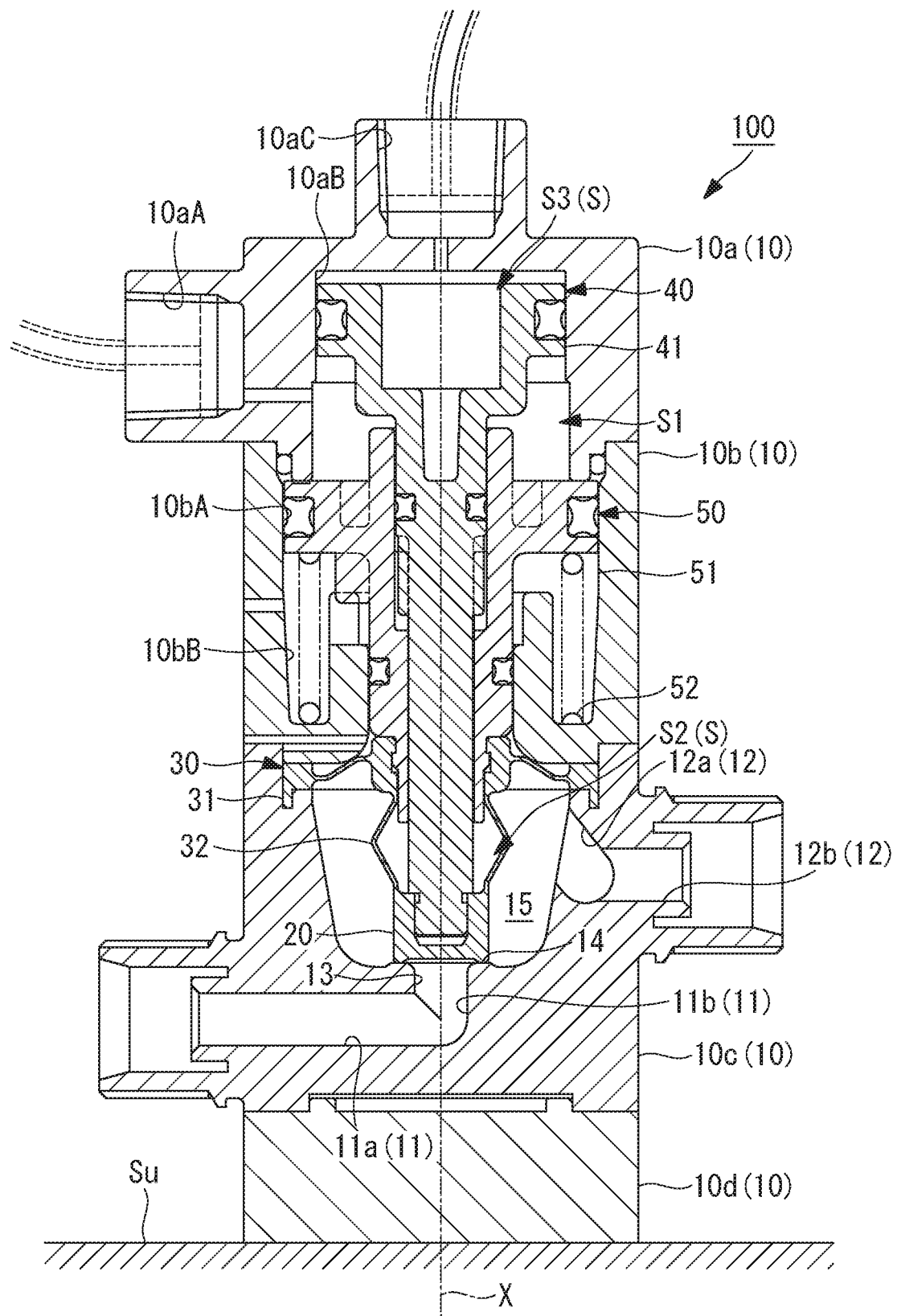
FIG. 10 is a longitudinal sectional view showing a closed state of a suck-back valve according to a fourth modification.

As shown in FIG. 10, the pressure chamber S3 is a space in which the compressed air is introduced from the introduction port 10*a*C and urges the axial member 41 downward by the pressure of the introduced compressed air. When the compressed air is introduced from the introduction port 10*a*C into the pressure chamber S3, the valve element part 20 comes into contact with the valve seat part 14 and the closed state is entered. When the compressed air is not introduced from the introduction port 10*a*C into the pressure chamber S3, and the compressed air is introduced from the introduction port 10*a*A into the pressure chamber S1, the valve element part 20 separates from the valve seat part 14 and the open state is entered. In such a manner, the compressed air is introduced from the introduction port 10*a*C, so that it is possible to reliably bring the valve hole 13 of the suck-back valve 100 into the closed state.

In the above description, the suck-back mechanism 50 includes the spring 52 that generates the upward urging force acting upward along the axis X to the tubular member 51, but another aspect may be employed. For example, as shown in a fifth modification of FIG. 11, an introduction port 10*b*C, into which the compressed air is introduced from the external compressed-air supply source (not shown), may be formed in the second housing 10*b*, and the compressed air may be introduced into a pressure chamber S4 that transmits the upward urging force to the tubular member 51.

Figure 11:
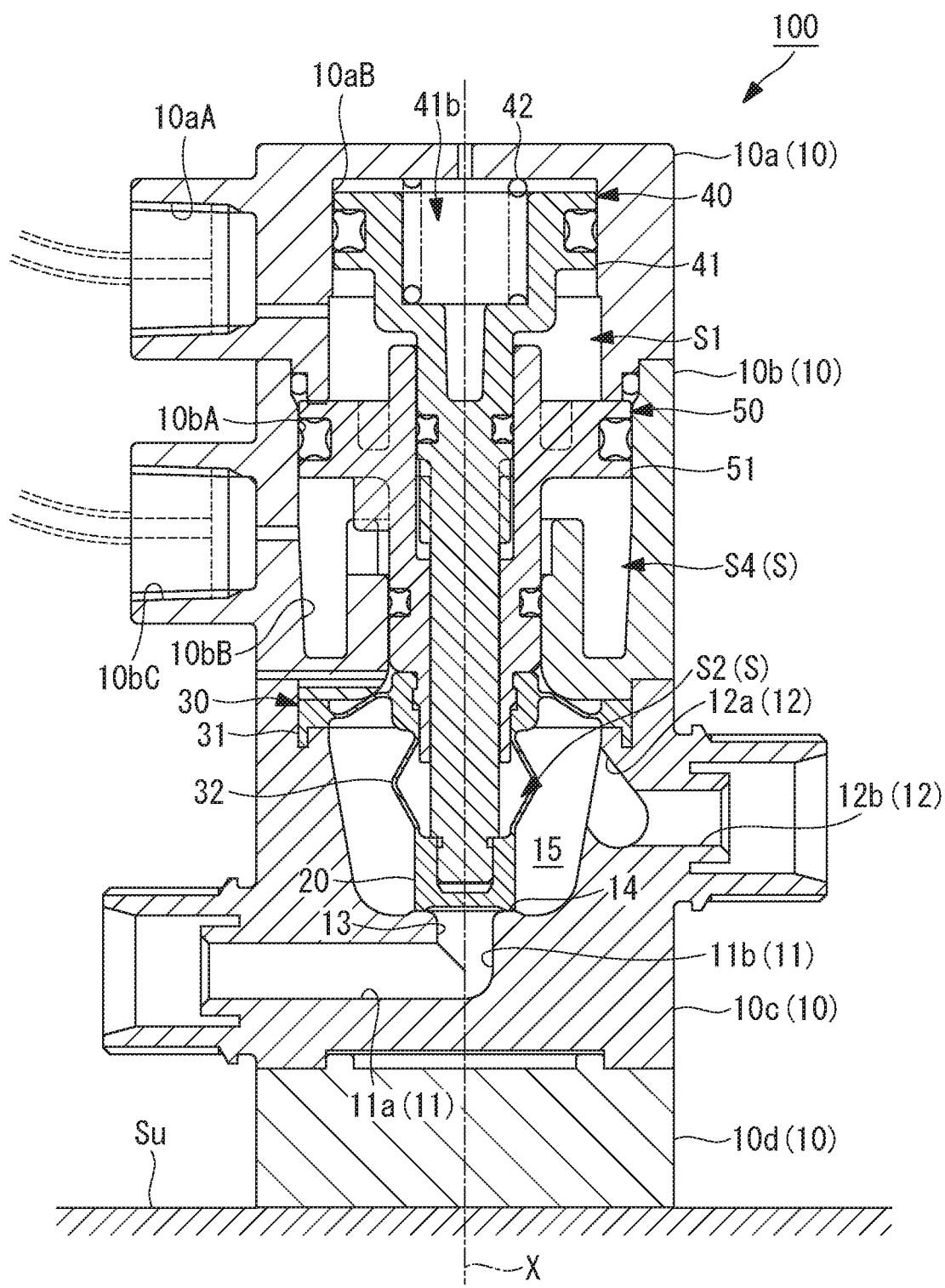
FIG. 11 is a longitudinal sectional view showing a closed state of a suck-back valve according to a fifth modification.

As shown in FIG. 11, the pressure chamber S4 is a space in which the compressed air is introduced from the introduction port 10*b*C and urges the tubular member 51 upward by the pressure of the introduced compressed air. When the compressed air is introduced from the introduction port 10*b*C into the pressure chamber S4, the diaphragm part 30 separates from the valve seat part 14, and the volume of the valve chamber 15 increases. When the compressed air is not introduced from the introduction port 10*b*C into the pressure chamber S4, and the compressed air is introduced from the introduction port 10*a*A into the pressure chamber S1, the valve diaphragm part 30 comes close to the valve seat part 14 and the volume of the valve chamber 15 decreases.

In the fourth modification shown in FIG. 10, the introduction port 10*b*C and a pressure chamber S4, into which the compressed air is introduced from the introduction port 10*b*C, may be provided in place of the spring 52. In this case, the suck-back valve 100 includes neither the spring 42 nor the spring 52. Further, in this case, the urging force to the axial member 41 is adjusted in accordance with the difference between the pressure from the pressure chamber S1 and the pressure from the pressure chamber S3. The urging force to the tubular member 51 is adjusted in accordance with the difference between the pressure from the pressure chamber S1 and the pressure from the pressure chamber S4.

What is claimed is:

1. A suck-back valve comprising:
   a housing part internally formed with an inlet flow path into which a liquid flows, a valve chamber, an outlet flow path that allows the liquid, led from the valve chamber, to flow to an outside, and a valve hole that leads the liquid from the inlet flow path to the valve chamber;
   a valve element part that comes into contact with or separates from a valve seat part disposed around the valve hole to bring the valve hole into a closed state or an open state;
   a diaphragm part that is attached to the housing part and isolates the valve chamber and an adjacent space, adjacent to the valve chamber, from each other;
   an open-close mechanism that brings the valve element part and the valve seat part into contact or separates the valve element part and the valve seat part from each other to switch between the closed state and the open state; and
   a suck-back mechanism that moves the diaphragm part in a direction in which the diaphragm part separates from the valve seat part, while maintaining the closed state where the valve element part is in contact with the valve seat part, to increase a volume of the valve chamber,
   wherein
   the valve element part and the diaphragm part are molded integrally,
   the open-close mechanism is disposed in the adjacent space, and
   the valve element part and the open-close mechanism are coupled in the adjacent space,
   the diaphragm part includes
   a base that is coupled to the suck-back mechanism, and
   a bellows part that couples between the base and the valve element part and in which a valley adjacent to a peak is formed,
   the valve element part is formed in a cylindrical shape extending along an axis, and
   a lower end of the bellows part is connected to the valve element part in a connection position coinciding with an outer peripheral surface of the valve element part in a radial direction orthogonal to the axis.

2. The suck-back valve according to claim 1, wherein
   the valve element part has a circular valve element surface moved along an axis by the open-close mechanism and disposed on a plane orthogonal to the axis,
   the valve seat part has a circular valve seat surface disposed on a plane orthogonal to the axis and having a radial width, orthogonal to the axis, longer than a radial width of the valve element surface, and the valve element surface and the valve seat surface come into contact in the closed state to form a circular seal region.

3. The suck-back valve according to claim 1, wherein the bellows part is obtained by forming a pair of the valleys adjacent to a single one of the peaks.

4. The suck-back valve according to claim 1, wherein the open-close mechanism includes:

an axial member that is accommodated in the housing part movably along the axis, has one end coupled to the valve element part, and receives an urging force in a direction in which the valve element part is separated from the valve seat part by pressure of a fluid introduced from the outside; and a first urging force generation part that transmits to the axial member an urging force in a direction in which the valve element part is brought closer to the valve seat part.

5. A suck-back valve comprising:

a housing part internally formed with an inlet flow path into which a liquid flows, a valve chamber, an outlet flow path that allows the liquid, led from the valve chamber, to flow to an outside, and a valve hole that leads the liquid from the inlet flow path to the valve chamber;

a valve element part that comes into contact with or separates from a valve seat part disposed around the valve hole to bring the valve hole into a closed state or an open state;

a diaphragm part that is attached to the housing part and isolates the valve chamber and an adjacent space, adjacent to the valve chamber, from each other;

an open-close mechanism that brings the valve element part and the valve seat part into contact or separates the valve element part and the valve seat part from each other to switch between the closed state and the open state; and a suck-back mechanism that moves the diaphragm part in a direction in which the diaphragm part separates from the valve seat part, while maintaining the closed state where the valve element part is in contact with the valve seat part, to increase a volume of the valve chamber, wherein the valve element part and the diaphragm part are molded integrally, the open-close mechanism is disposed in the adjacent space, and the valve element part and the open-close mechanism are coupled in the adjacent space, the open-close mechanism includes:

an axial member that is accommodated in the housing part movably along the axis, has one end coupled to the valve element part, and receives an urging force in a direction in which the valve element part is separated from the valve seat part by pressure of a fluid introduced from the outside; and a first urging force generation part that transmits to the axial member an urging force in a direction in which the valve element part is brought closer to the valve seat part, the suck-back mechanism includes:

a tubular member that is accommodated in the housing part movably along the axis, has one end coupled to the diaphragm part, and receives an urging force in a direction in which the diaphragm part is brought closer to the valve seat part by pressure of a fluid introduced from the outside; and a second urging force generation part that transmits to the tubular member an urging force in a direction in which the diaphragm part is separated from the valve seat part, and the tubular member accommodates the axial member along the inner peripheral surface movably along the axis.

* * * * *